United States Patent [19]

Chamblee et al.

[11] Patent Number: 5,131,980
[45] Date of Patent: * Jul. 21, 1992

[54] HYDROCYCLONE REMOVAL OF STICKY CONTAMINANTS DURING PAPER RECYCLING

[75] Inventors: Wayne J. Chamblee; Brian F. Greenwood, both of Glens Falls, N.Y.

[73] Assignee: Kamyr, Inc., Glens Falls, N.Y.

[*] Notice: The portion of the term of this patent subsequent to Dec. 3, 2008 has been disclaimed.

[21] Appl. No.: 583,042

[22] Filed: Sep. 17, 1990

Related U.S. Application Data

[63] Continuation-in-part of Ser. No. 564,656, Aug. 9, 1990, Pat. No. 5,069,751.

[51] Int. Cl.⁵ .......................... D21B 1/32; D21D 5/22; D21D 5/24; B03D 1/02
[52] U.S. Cl. .......................................... 162/4; 162/5; 209/170; 210/703; 210/787
[58] Field of Search ............... 162/4, 5; 787/216, 380; 209/164, 170; 210/703, 221.2, 787

[56] References Cited

U.S. PATENT DOCUMENTS

| | | | |
|---|---|---|---|
| 2,532,885 | 12/1950 | Berges | 92/28 |
| 2,849,930 | 9/1958 | Freeman | 92/28 |
| 3,391,787 | 7/1968 | Salomon . | |
| 3,557,956 | 1/1971 | Braun . | |
| 3,807,142 | 4/1974 | Rich et al. | 55/204 |
| 4,279,743 | 7/1981 | Miller | 209/211 |
| 4,397,741 | 8/1983 | Miller | 209/170 |
| 4,399,027 | 8/1983 | Miller et al. | 209/164 |
| 4,557,826 | 12/1985 | Flucher et al. | 209/11 |
| 4,749,473 | 6/1988 | Shiori et al. | 162/4 |
| 4,838,434 | 6/1989 | Miller et al. | 209/164 |
| 4,997,549 | 3/1991 | Atwood | 209/164 |

FOREIGN PATENT DOCUMENTS 667248 6/1979 U.S.S.R. .

OTHER PUBLICATIONS

Paper Recycling's Contaminant Barrier; Wand; "1989 Contaminant Problems and Strategies in Wastepaper Recycling", TAPPI Seminar Notes, pp. 3-6.

"Stickies and Recycled Boxboard"; Verseput; 1989 Contaminant Problems and Strategies in Wastepaper Recycling, TAPPI Seminar Notes, pp. 7-10.

Primary Examiner—W. Gary Jones
Assistant Examiner—Todd J. Burns
Attorney, Agent, or Firm—Nixon & Vanderhye

[57] ABSTRACT

The removal of sticky contaminants during the production of recycled paper is accomplished utilizing a hydrocyclone froth flotation process. Paper having sticky contaminants from labels, tapes, hot melts, and other tacky substances, is reduced to a finely comminuted liquid solids suspension of about 1-4% consistency. The suspension is introduced into a first end of a vortex in a hydrocyclone, and the air is sparged radially inwardly into the suspension vortex by passing it through a porous inner wall of the hydrocyclone. Ligher weight sticky contaminants move to the center of the hydrocyclone, facilitated by the radially inward movement of the sparging air, and hydrophobic sticky contaminants attach to the air bubbles and form a foam. The foam and lightweight sticky contaminants are removed from the first end of the vortex, while the pulp which has had sticky contaminants removed therefrom is discharged from the second end of the vortex, opposite the first end. A plurality of vertical axis hydrocyclones may be connected together in series, with a plurality of the series connected in parallel, to provide the most effective treatment. Removal of sticky contaminants can be practiced prior to or simultaneously with deinking.

19 Claims, 3 Drawing Sheets

HYDROCYCLONE REMOVAL OF STICKY CONTAMINANTS DURING PAPER RECYCLING

RELATED APPLICATIONS

This application is a continuation-in-part of application Ser. No. 07/564,656 filed Aug. 9, 1990, now U.S. Pat. No. 5,069,751.

BACKGROUND AND SUMMARY OF THE INVENTION

In the production of recycled paper from relatively high quality stocks, major difficulty in producing a high quality end product is the removal of sticky contaminants from the pulp. "Sticky contaminants" as that term is used in the art relates to a wide variety of tacky contaminants including tapes, labels, and hot melt glues. The major difficulty with sticky contaminants is that they can bleed or otherwise come out of the pulp at any time, including when the pulp stock first hits the wire of the paper making machine, or later on during converting or printing stages. Sticky contaminants have a major adverse impact on runnability of the final paper produced.

Primary sources of sticky contaminants include single side pressure sensitive tapes of all types, double face splicing tapes, hot melt glue such as used in bookbindings, pressure sensitive labels, self-seal envelopes, and stick-on notes. With the exception of bookbinding hot melts (which may be removed by screening and cleaning), all are extraordinarily difficult to remove by conventional technology. As a matter of fact, normal deinking formulations, if anything, appear to enhance the tackiness of the pressure sensitive adhesives and thereby contribute to the problem.

As used in the present specification and claims, "sticky contaminants" is intended to refer to all types of sticky contaminants from the sources as set forth above, except for bookbinding hot melts.

Many of the sticky contaminants are plastics, and the vast majority are of relatively lightweight material, having a specific gravity less than that of the pulp which they are contaminate. Those that are plastics by their very nature are hydrophobic, and it is possible to render other sticky contaminants hydrophobic too. According to the present invention, the relatively low specific gravity and the hydrophobic nature of the sticky contaminants are taken advantage of in effecting removal. The removal according to the invention can be practiced independent of deinking—that is, for example, in a stage prior to deinking in which no deinking facilitating chemicals have yet been added—or it may take place simultaneously with deinking.

According to one aspect of the present invention, a method of removing sticky contaminants from recycled paper cellulosic pulp containing such contaminants is provided by practicing the steps of: continuously reducing paper having sticky contaminants associated therewith to a finely comminuted liquids-solids suspension flow having a low solids consistency; introducing the suspension into a first end of a vortex; sparging air into the suspension in the vortex to cause sticky contaminants to attach to air bubbles and move toward the first end of the vortex, a foam being formed, while the pulp moves to the second end, opposite the first end, of the vortex; and removing foam and lightweight sticky contaminants from the first end of the vortex while pulp without (or with less) sticky contaminants is discharged from the second end of the vortex. The lightweight component of the sticky contaminants tends to migrate radially toward the center of the vortex, and thus ultimately is rejected with the foam of hydrophobic particles and air bubbles. Also, since the sparging air is reduced radially inwardly into the suspension, the radial inward movement of the lightweight material of the sticky contaminants toward the center of the vortex is enhanced, providing another motive force contributing to removal of sticky contaminants from the pulp. The hydrophobic sticky contaminants, such as plastics, attach to air bubbles being introduced into the vortex, foaming, and being removed as foam from the first end of the vortex.

The method according to the invention may be practiced on suspensions having a solids consistency of about 1-4% (e.g., over 1.5%), and the pulp may be deaerated after discharge from the vortex. Further, the gas component of the foam removed from the vortex first end may be separated from the solids and liquid component thereof by feeding the foam to a cyclone. While the hydrocyclone used to practice the invention may have a variety of different orientations, it preferably has a vertical axis with the first end at the top and the second end at the bottom, and the sparging air is directed through porous side walls of the hydrocyclone to create a foam of fine bubbles.

If necessary, the pulp flow may be broken up into a plurality of different flow paths and the sticky contaminant removing steps (sparging of air into the vortex, etc.) practiced in each of the flow paths, with the flow path ultimately recombined. A number of in-series stages may be provided within each flow path for treatment to remove sticky contaminants, and the pulp may be deaerated between each stage within each flow path. Again, sticky contaminants removal may be practiced prior to or simultaneously with deinking utilizing the same equipment.

According to another aspect of the present invention a method of manufacturing recycled paper is provided. Cellulosic paper having sticky contaminants associated therewith is reduced to a finely comminuted liquid solids suspension flow, and is screened, and then subjected to froth flotation. The particular froth flotation process is as described above, i.e. utilizing a vortex and air sparging. The pulp produced is washed and thickened, and paper is made from the thickened pulp.

The invention also relates to a recycled paper pulp substantially free of sticky contaminants which is produced from the contaminated pulp described above. While conventional recycled pulps free of sticky contaminants can typically only be produced by careful source separation to remove as many of the possible contaminating sources as possible, according to the invention the sticky contaminants can actually be removed, thereby providing a solution to the paper recycling industry's most universal and serious problem.

It is a primary object of the present invention to provide for the effective removal of sticky contaminants from recycled paper cellulosic pulp. This and other objects of the invention will become clear from an inspection of the detailed description of the invention and from the appended claims.

DETAILED DESCRIPTION OF THE DRAWINGS

Figure 1:
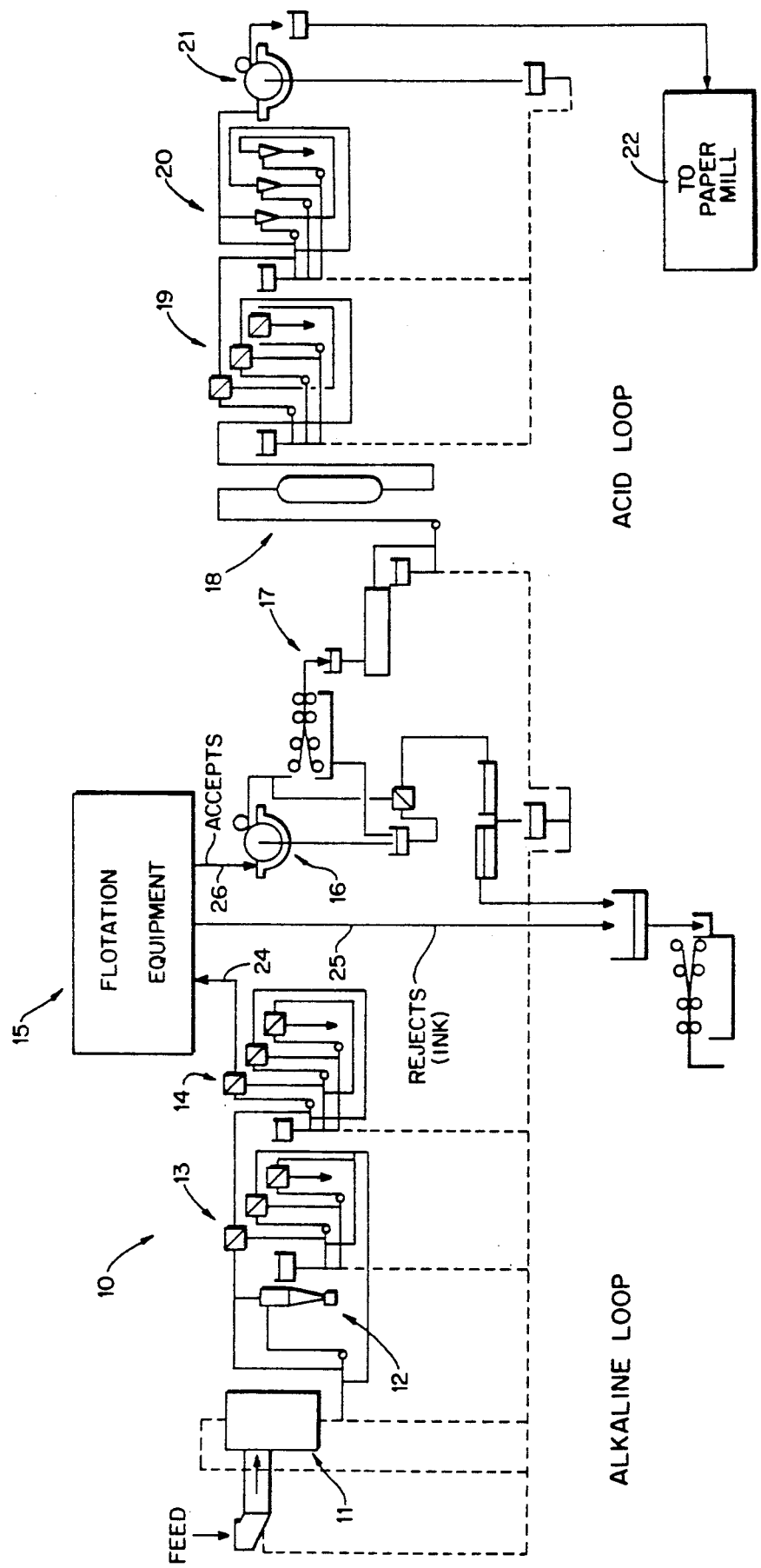
FIG. 1 is a schematic view of a typical system for producing recycled paper, showing the froth flotation apparatus as used in practicing the invention.

FIG. 1 illustrates one conventional system for producing recycled paper, the system being illustrated generally by reference numeral 10. The exact sequencing of the components may be changed and some components deleted depending upon the composition of the feedstock, or other parameters.

Used paper, having sticky contaminants (and typically having print thereon) and which may have a component of virgin wood fiber, is fed into a conventional pulper 11 which comminutes the cellulosic feed to provide a liquids-solids suspension. The suspension—which in accordance with the invention—is diluted to a solids consistency of about 1-4%, passes to one or more high density cleaners 12, coarse screens 13, fine screens 14, and then to a froth flotation system 15. The accepts from the froth flotation system 15 pass to a washer 16, dispersion apparatus 17, an optional bleaching stage 18, fines screens 19, and cyclone cleaners 20, and then is thickened at thickener 21 and discharged to a paper mill 22 where it is formed into recycled paper. The feed of suspension into the froth flotation system 15 is through inlet 24, while the rejects (e.g. sticky contaminants, with or without ink particles) pass in overflow conduit 25, and the accepts (pulp) in underflow outlet 26.

During the practice of the recycled paper production procedure, typically the suspension will have a temperature of about 30°-60° C. (at least in system 15). During dispersion and bleaching the temperature may be as high as 90° C. The liquid for providing the suspension is primarily water, but may also include chemicals to render sticky contaminants hydrophobic (e.g. added in pulper 11), or if used for simultaneous deinking, also may include other chemicals to facilitate separation of the ink from the comminuted paper, or to otherwise enhance the process. For example if deinking is simultaneously practiced, as disclosed in U.S. Pat. No. 4,331,534, hydrogen peroxide, sodium hydroxide, waterglass, and a washing agent (e.g. Soap-Olinor ®) and a surfactant may be added directly into the pulper 11, or at another suitable stage (e.g. after sticky contaminant removal hydrocyclones).

Figure 2:
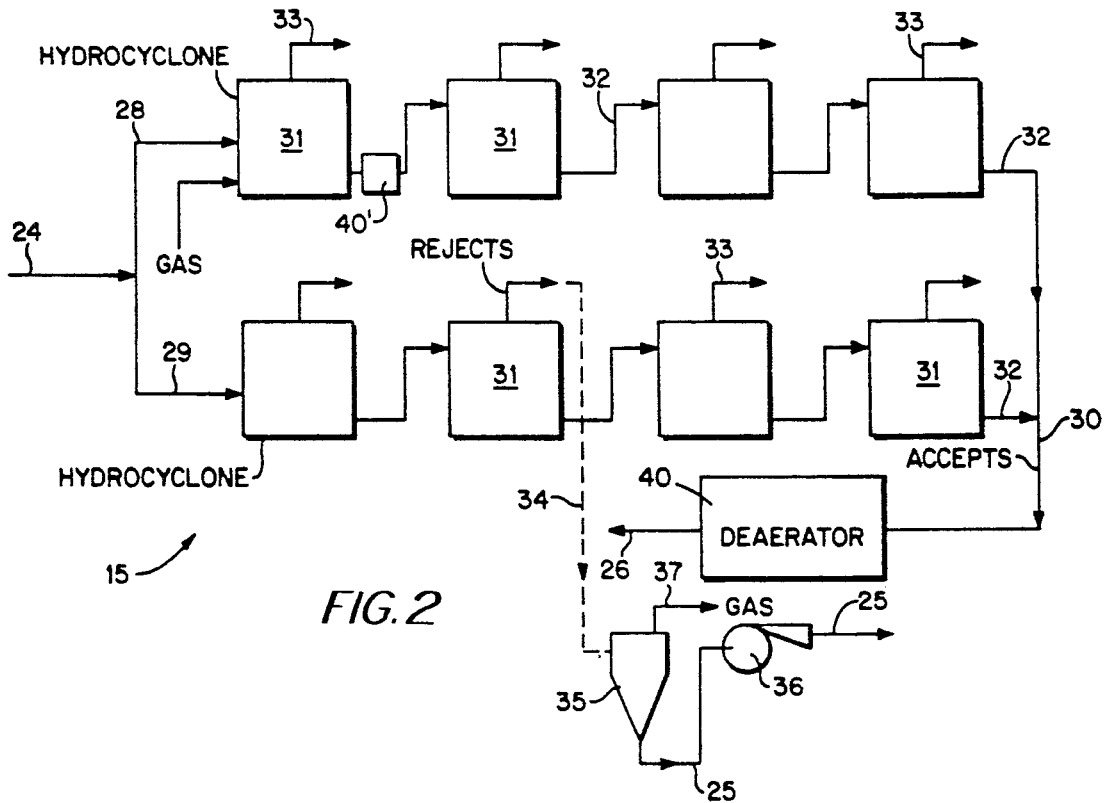
FIG. 2 is a detail schematic view of the froth flotation system as used in practicing the invention.

The froth flotation system 15 according to the present invention is illustrate schematically in FIG. 2. The suspension inlet 24 preferably is broken into a plurality of flow paths 28, 29. While only two flow paths are illustrated in FIG. 2, it is to be understood that there may be many more parallel flow paths, depending upon the particular requirements of the plant 10. The flow paths 28, 29 reconnect in a common outlet conduit 30 for accepts (pulp).

Disposed in each flow path 28, 29 are a plurality of series connected hydrocyclones 31. Each hydrocyclone 31 has an accepts (pulp) outlet 32, and a rejects (e.g. ink particles, sticky contaminants, and foam) outlet 33. The outlets 33 also reconnect in a common conduit 34, which passes through a cyclone 35 in which the air component is removed. The particle and liquid components (e.g. sticky contaminants, with or without ink, and water) of the rejects is discharged into rejects conduit 25, while the gas component is withdrawn through the top of the cyclone 35, and discharged at 37. The gas in conduit 37 may be recycled to the hydrocyclones 31 as inlet gas, treated, discharged, or otherwise acted upon. The rejects in stream 25 may be pumped by pump 36 to a fiber recovery system. The fiber recovery system may consist of additional stages of air sparged hydrocyclones, conventional froth flotation cells, thickeners/washers or other means of fiber recovery. The recovered fiber may be returned to the inlet flow to the hydrocyclones (e.g to line 24).

In the froth flotation system 15 of FIG. 2, it is also preferably desirable to deaerate the pulp in the accepts conduit 30. This is accomplished by passing the conduit 30 into a conventional deaerating apparatus 40, the deaerated pulp being discharged in accepts conduit 26. It may be necessary to deaerate between units 31 in place of or in addition to deaeration at 40. For example a deaertor 40' may be provided between each series connected hydrocyclones 31 as illustrated in FIG. 2. The deaerators 40, 40' may be cyclones, degassing pumps, or like conventional degassing units.

Figure 3:
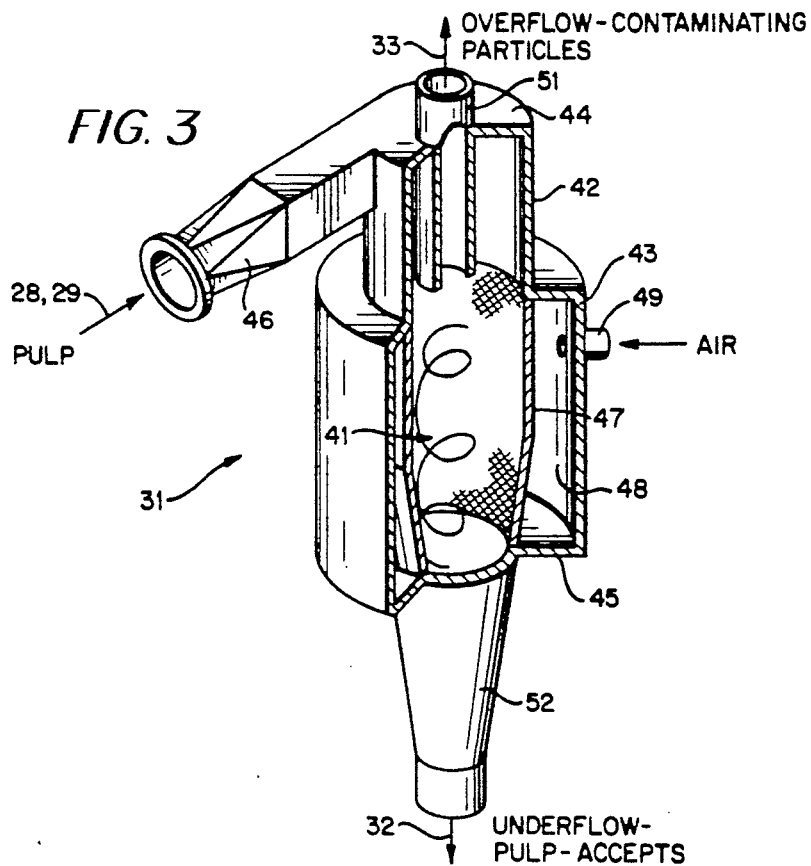
FIG. 3 is a top perspective view, with portions of the structure cut away for clarity of illustration, of an exemplary hydrocyclone utilizable in the system of FIG. 2.

A typical hydrocyclone 31 according to the present invention is illustrated more clearly in FIG. 3. The hydrocyclone 31 is used to establish a vortex, typically but not necessarily a vertical axis vortex 41.

The basic construction of the hydrocyclone 31 is as shown in U.S. Pat. Nos. 4,279,743 and 4,399,027. It includes a hollow cylindrical body having a generally vertical axis, the body preferably being in step form, as indicated by body portions 42, 43 in FIG. 3. The body 42, 43 has a top 44, and a bottom 45. The suspension inlet 46 is adjacent an end (the top 44 in FIG. 3) thereof, and provides for the introduction of the suspension in flow paths 28, 29, etc.

Disposed within the interior of the body portion 43 is a porous interior wall 47. The porous wall 47 is surrounded plenum 48, and sparging air (gas) is introduced into the plenum 48 by air inlet 49, the air passing through the porous wall 47 and moving radially inwardly (pushing lightweight sticky contaminants with it), then upwardly to entrain hydrophobic sticky contaminants and/or ink particles in the suspension within a foam.

The sparging air introduced into the vortex 41 passes through the high shear boundary layer in the hydrocyclone 31, creating a froth of very fine bubbles. The bubbles then attach to hydrophobic sticky contaminant and/or ink particles trapped in the suspension. The bubbles and attached particles, and the lightweight sticky contaminants, migrate to the froth zone near the center of the vortex 41, under the influence of the centrifugal forces present in the unit, and then to overflow outlet 51 at the first end (top 44 in FIG. 3) of the device 31. The accepts/pulp is withdrawn through the outlet 52 adjacent the second end (bottom 45 in FIG. 3) of the hydrocyclone 31. The sparging air introduction through inlet 49, and other components are operated so that typically about 2-15% of the mass flow of suspension into inlet 46 is removed through overflow 51 (with the foam), while about 98-85% of the flow of suspension into the inlet 46 exits the pulp outlet 52.

The hydrocyclone may take a wide variety of different forms. Another exemplary form, which is illustrated (along with many other embodiments) in U.S. Pat. No. 4,838,434, is shown generally by reference numeral 131 in FIG. 4. In the FIG. 4 embodiment all structures comparable to those in the FIG. 3 embodiment are illustrated by the same reference numeral only preceded by a "1".

Figure 4:
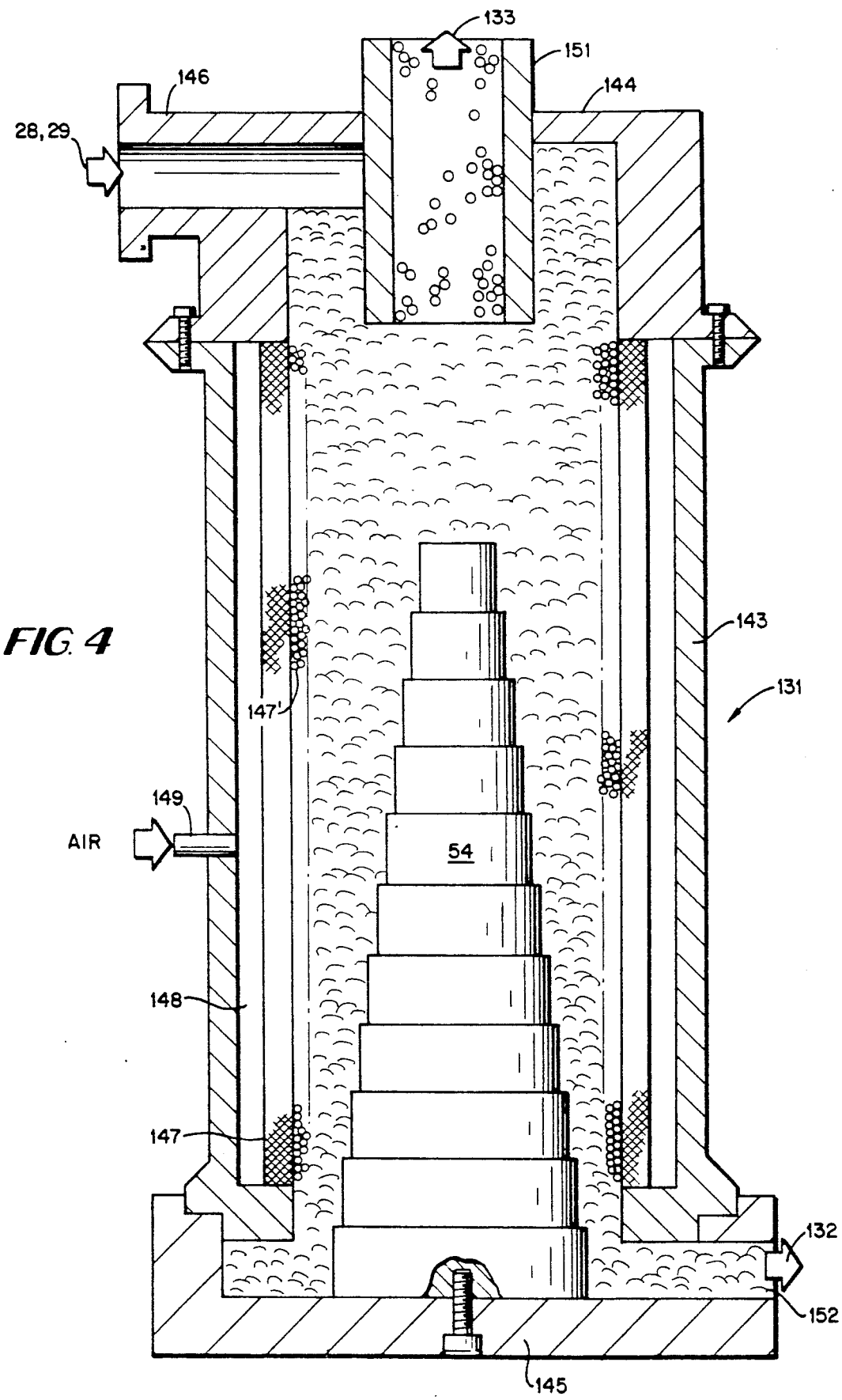
FIG. 4 is a side schematic cross-sectional view of another exemplary embodiment of hydrocyclone utilizable according to the invention.

The major distinctions of the embodiment of FIG. 4 over that of FIG. 3 are: The provision of the porous interior wall in the form of the porous wall 147 itself, with an inner surface 147' against which a swirl layer of suspension forms. The sparging gas is introduced at 149, and the accepts stream 132 is withdrawn from the hydrocyclone 131, just above the bottom 145. Disposed interiorly of the hollow body 143, preferably extending upwardly from the bottom 145, is a generally conical pedestal 54, which may have any of the configurations illustrated in said U.S. Pat. No. 4,838,434, and which may have a mechanical or hydraulic means associated with it to increase or decrease the pedestal diameter and/or height to control operation of the hydrocyclone 131.

Utilizing the apparatus according to the invention, paper having sticky contaminants associated therewith is reduced in pulper 11 to a finely comminuted liquids-solids suspension flow having a low solids consistency. The suspension—in line 26—is introduced into a (e.g. a generally vertical axis) vortex by introducing a tangential inlet 46 to one end (e.g. the top) of the hollow body 42. Air is sparged into the suspension in the vortex 41, being introduced through inlet 49 and passing through porous wall 47, to cause hydrophobic particles in the suspension to rise in a foam, and lightweight particles to move toward the center, while the cellulosic pulp moves toward the second end of (e.g. downwardly in) the vortex 41. The foam and lightweight particles are removed in the foam stream through overflow outlet 51, while the pulp is removed in a pulp stream through underflow outlet 52, distinct from the overflow outlet 51. The pulp is deaerated in deaerater 40, and then passes on to be washed at stage 16, and otherwise conventionally processed, as illustrated in FIG. 1. The rejects in overflow outlet 51 ultimately have the air removed therefrom as in cyclone 35, with the ultimate rejects (including the removed particles including sticky contaminants with or without ink) passing in rejects conduit 25, and treated in a conventional manner. During the practice of the froth flotation process in the system 15, the suspension typically has a temperature of about 30°-60° C., and typically is at a consistency of about 1-4% (e.g. over 1.5%).

Deinking may take place simultaneously with sticky contaminants removal, or may take place first in a first system of hydrocyclones 31, with deinking taking place in a second system of hydrocyclones after deinking facilitating chemicals have been added. The final pulp produced according to the invention is substantially free of sticky contaminants.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and pulps.

What is claimed is:

1. A method of removing sticky contaminants from recycled paper cellulosic pulp containing such contaminants, comprising the steps of continuously:
    (a) reducing paper having lightweight and hydrophobic sticky contaminants associated therein to a finely comminuted liquid-solids suspension flow having a solids consistency of about 1-4%;
    (b) introducing the suspension into a first end of a vortex;
    (c) sparging air radially inwardly into the suspension in the vortex, to cause the lightweight sticky contaminants to move radially, and to cause the hydrophobic sticky contaminants to attach to air bubbles and move toward the fist end of the vortex; a foam having a solids and liquid content being formed while cellulosic pulp moves to the second end, opposite the first end, of the vortex; and
    (d) removing foam and lightweight sticky contaminants from the first end of the vortex, while pulp with sticky contaminants removed is discharged from the second end of the vortex, using only the vortex and sparged air.

2. A method as recited in claim 1 comprising the further step (e) of deaerating the pulp discharged in step (d).

3. A method as recited in claim 2 comprising the further step (f) of separating the gas component of the foam removed in step (d) from the solids and liquid component of the foam.

4. A method as recited in claim 3 wherein step (f) is practiced by feeding the foam to a cyclone.

5. A method as recited in claim 1 using a vertical axis hydrocyclone having an air permeable side wall, an overflow outlet from the top, and an underflow outlet from the bottom, and wherein steps (b)-(d) consist of by introducing the suspension into the hydrocyclone, directing air through the side wall of the hydrocyclone to create a foam of fine bubbles which thereby attach to trapped in suspension solids to be carried with foam to the overflow outlet, and withdrawing the pulp from the underflow outlet.

6. A method as recited in claim 1 comprising the further step (g), between steps (a) and (b), of breaking the suspension flow into a plurality of flow paths, and practicing steps (b)-(d) in each flow path, and recombining the pulp and foam flow streams from step (d) from all the flow paths.

7. A method as recited in claim 6 comprising the further step of practicing steps (b)-(d) a plurality of times in in-series stages within each flow path.

8. A method as recited in claim 7 comprising the further step of deaerating the pulp between each stage within each flow path.

9. A method as recited in claim 1 wherein step (a) is practiced to provide a suspension having a temperature of about 30°-60° C.

10. A method as recited in claim 1 wherein the paper in step (a) also has print thereon, and wherein steps (b)-(d) are practiced to effect deinking simultaneously with the removal of sticky contaminants.

11. A method as recited in claim 10 wherein step (a) is practiced to provide the liquid component of the suspension as primarily water, but also including other chemicals to facilitate separation of ink from comminuted paper.

12. A method as recited in claim 1 comprising the further step of deinking the pulp by practicing steps (b)-(d) in a second vortex, ink particles being removed from the first end of the second vortex.

13. A method of manufacturing recycled paper, comprising the steps of continuously: reducing cellulosic paper having lightweight and hydrophobic sticky contaminants associated therewith to a finely comminuted liquid-solids suspension flow having a low solids consistency; screening the suspension to remove reject particles; subjecting the suspension to froth flotation to produce a pulp; washing and thickening the pulp; and making paper from the thickened pulp; wherein said froth flotation step is practiced with suspension having a solids consistency of over 1.5%, by:
(i) introducing the suspension into a first end of a vortex;
(ii) sparging air radially inwardly into the suspension in the vortex, to cause the lightweight sticky contaminants to move radially upwardly and the hydrophobic sticky contaminants to attach to air bubbles and move toward the first end of the vortex, a foam being formed while cellulosic pulp moves to the second end, opposite the first end, of the vortex; and
(iii) removing foam and lightweight sticky contaminants from the first end of the vortex, while pulp with sticky contaminants partially or completely removed is discharged from the second end of the vortex.

14. A method as recited in claim 13 using a vertical axis hydrocyclone for the froth flotation step, the hydrocyclone having an air permeable side wall, an overflow outlet for the top, and an underflow outlet from the bottom; and wherein said introducing, sparging, and removing steps are practiced by introducing the suspension into the hydrocyclone adjacent the top thereof, directing air through the wall of the hydrocyclone to create a foam of fine bubbles which thereby attach to sticky contaminant solids trapped in suspension to be carried with foam to the overflow outlet, and withdrawing the pulp from the underflow outlet.

15. A method as recited in claim 13 wherein the froth flotation comprises the further step of deaerating the pulp.

16. A method as recited in claim 13 wherein the paper also has print thereon, and wherein steps (i)-(iii) are practiced to effect deinking simultaneously with the removal of sticky contaminants.

17. A method as recited in claim 13 wherein the paper has print thereon, and wherein steps (i) through (iii) are practiced in a second vortex, ink particles being removed from the first end of the second vortex, to effect deinking of the paper.

18. A method of manufacturing recycled paper, comprising the steps of continuously: reducing cellulosic paper having lightweight and hydrophobic sticky contaminants associated therewith a finely comminuted liquid-solids suspension flow having a low solids consistency; screening the suspension to remove reject particles; subjecting the suspension to froth flotation to produce a pulp; washing and thickening the pulp; and making paper from the thickened pulp; wherein said froth flotation step is practiced with suspension having a solids consistency of about 1-4%, by:
(i) introducing the suspension into a first end of a vortex;
(ii) sparging air radially inwardly into the suspension in the vortex, to cause the lightweight sticky contaminants to move radially upwardly and the hydrophobic sticky contaminants to attach to air bubbles and move toward the first end of the vortex, a foam being formed while cellulosic pulp moves to the second end, opposite the first end, of the vortex; and
(iii) removing foam and lightweight sticky contaminants from the first end of the vortex, while pulp with sticky contaminants partially or completely removed is discharged from the second end of the vortex.

19. A method as recited in claim 18 wherein the froth flotation is practiced with suspension having a solids consistency of over 1.5%.

* * * * *